Jan. 12, 1926.                                                              1,569,674
                            R. J. S. PIGOTT
                                 VALVE
                           Filed June 2, 1922
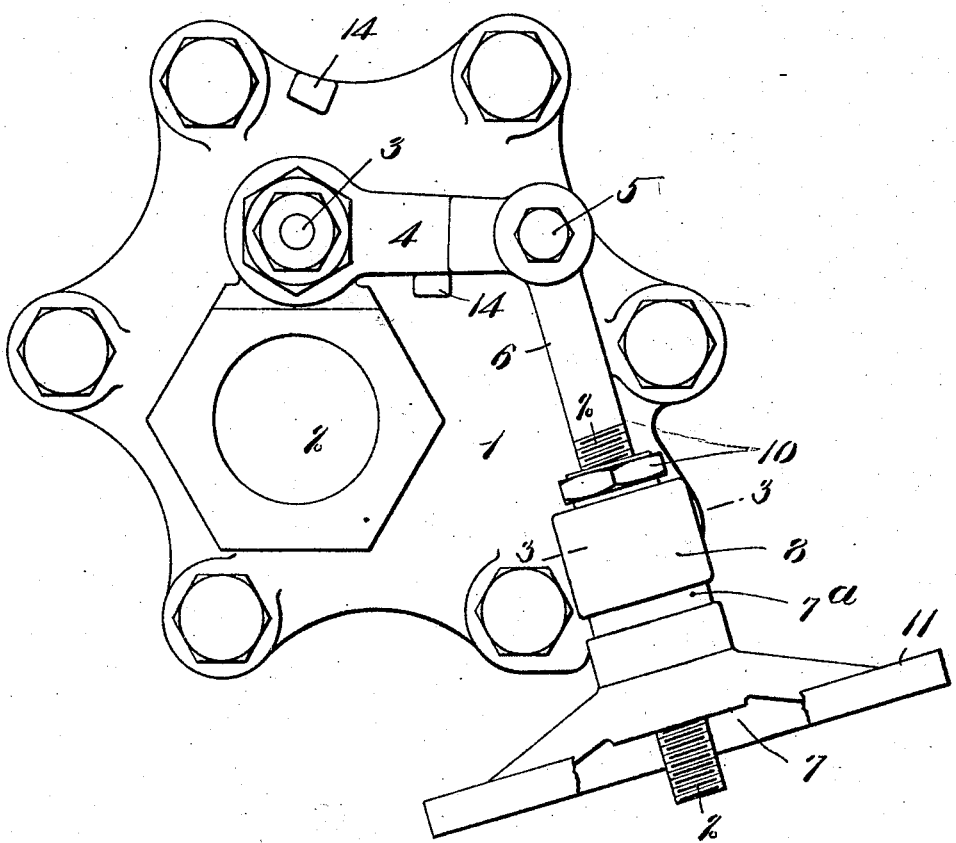
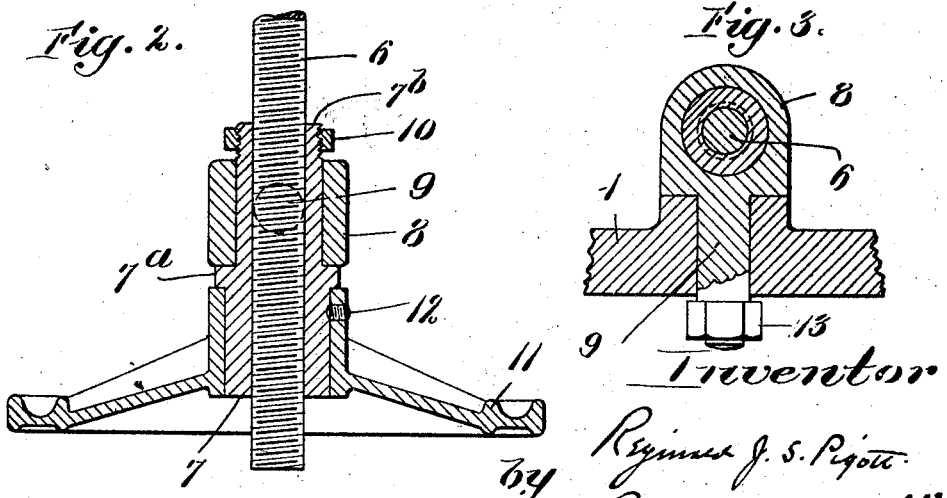
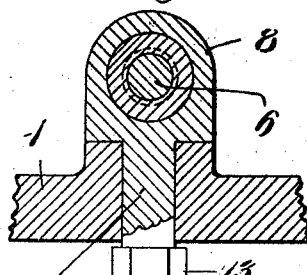

Patented Jan. 12, 1926.

1,569,674

UNITED STATES PATENT OFFICE.

REGINALD J. S. PIGOTT, OF BROOKLINE, MASSACHUSETTS, ASSIGNOR TO CROSBY STEAM GAGE & VALVE COMPANY, OF BOSTON, MASSACHUSETTS, A CORPORATION OF MASSACHUSETTS.

VALVE.

Application filed June 2, 1922. Serial No. 565,467.

*To all whom it may concern:*

Be it known that I, REGINALD J. S. PIGOTT, a citizen of the United States, residing at Brookline, in the county of Norfolk and State of Massachusetts, have invented certain new and useful Improvements in Valves, of which the following is a specification.

This invention relates to valves of the swing gate type and its object is to provide for the easy opening and closing of the valve, which object is accomplished by the mechanism shown in the drawings, in which:

Figure 1 is a view of the exterior of a valve case with the improved mechanism attached thereto; Fig. 2 is a section on the line 2—2, Fig. 1, and Fig. 3 is a section on the line 3—3, Fig. 1.

Within the case 1 is disposed the valve 2 operatively controlled by the spindle 3 extending through the wall of the case to the exterior thereof, all in a well known manner, which need not be more particularly described.

To the outer end of spindle 3 is operatively attached the inner end of the lever 4, to the outer end of which lever is pivoted at 5 one end of the screw 6, which extends through and interiorly engages the correspondingly threaded bushing 7, which interiorly and rotatably engages the hub 8, which is disposed on said bushing and furnished with stem 9, which is rotatably disposed in the case 1, being confined lengthwise therein by nut 13, thus enabling hub 8 and therewith bushing 7 and screw 6 to oscillate, as the screw moves lengthwise through the bushing, as necessitated by the pivoted connection of the screw with the lever 4.

The bushing 7 is furnished centrally, exteriorly, with the collar 7ª and is threaded at its upper end 7ᵇ for engagement by the nut 10, between which collar 7ª and nut 10 is confined the hub 8, which arrangement prevents lengthwise movement of the bushing 7, while permitting it to be freely rotated by the wheel 11 mounted on the lower end thereof. The range of movement of lever 4 is limited by stops 14 disposed on the case.

I claim:

1. In a valve of the character described, means for operating the valve controlling spindle comprising, in combination, a lever operatively attached to the spindle; a screw having one end pivoted to the lever; a bushing rotatably disposed on the screw in threaded engagement therewith; a hub swivelled in the case about an axis at right angles to the longitudinal axis of the screw and interiorly rotatably engaged by the bushing; and means for rotating the bushing and thereby actuating the screw.

2. A valve having, in combination, a valve gate, a spindle on which the gate is mounted to permit swinging thereof, an oscillating lever attached to the spindle, an actuator member pivoted at the end of the oscillating lever, a bushing through which the actuator member is capable of longitudinal movement, means for mounting the bushing to permit rotative movement thereof about an axis at right angles to the longitudinal axis of the actuator member, and means for moving the actuator member longitudinally through the bushing.

3. In a valve of the character described, means for operating the valve controlling spindle comprising, in combination, a lever operatively attached to the spindle; a screw pivoted to the lever; a bushing mounted on the case and in threaded engagement with the screw and rotatable about an axis at right angles to the longitudinal axis of the screw; and means for rotating the bushing and thereby actuating the screw.

REGINALD J. S. PIGOTT.